United States Patent [19]
Gatto et al.

[11] Patent Number: 5,847,948
[45] Date of Patent: Dec. 8, 1998

[54] SCANNER POWER MODULE

[75] Inventors: Jean-Marie Gatto, London, United Kingdom; Thierry Brunet De Courssou, Palo Alto, Calif.

[73] Assignee: Cyberscan Technology, Inc., Palo Alto, Calif.

[21] Appl. No.: 902,871

[22] Filed: Jul. 30, 1997

[51] Int. Cl.$^6$ .................................................. H02M 7/00
[52] U.S. Cl. ............................................................ 363/65
[58] Field of Search ................................ 363/65, 34, 37, 363/71, 72, 131, 132; 307/43, 64, 82, 83

[56] References Cited

U.S. PATENT DOCUMENTS

| | | | |
|---|---|---|---|
| 4,860,185 | 8/1989 | Brewer et al. | 363/41 |
| 5,233,286 | 8/1993 | Rozman et al. | 322/90 |
| 5,359,278 | 10/1994 | Notohara et al. | 323/222 |

*Primary Examiner*—Adolf Deneke Berhane
*Attorney, Agent, or Firm*—Young Law Firm

[57] ABSTRACT

A circuit that provides all the power signals required to operate sheet-fed, flatbed, duplex and slides document scanners. The circuit accepts universal worldwide primary AC input or alternatively commonly found DC input and generates all the power supply outputs and power signals required by the scanner digital control electronics, analog electronics, image sensor electronics, light sources, stepper motors, auxiliary motors, solenoids and relays.

34 Claims, 5 Drawing Sheets

SCANNER POWER MODULE

BACKGROUND OF THE INVENTION

1. Field of the Invention

The invention pertains to the field of document scanner peripherals for computers.

2. Description of the Related Art

A document scanner is an extremely desirable peripheral that computer users would like to have available on their computer, like a floppy disk drive, a printer, a modem or a multimedia sound card. While prices of document scanners for personal computers users are rapidly declining, document scanners have not yet realized their anticipated success due to the lack of integration, difficulty of use and slow speed.

Scanner technology involves knowledge and mastery of numerous disciplines: monochrome image sensors, color image sensors, light sources, stepper motors, paper feeders, motion drive mechanisms, power supplies, host interfaces, image processing and document processing. The intense price competition for basic document scanner models from Asian manufacturers forces non-Asian companies to abandon investment in that area. Innovation suffers and advancement in document scanner technology lags. Only manufacturers of sophisticated, extremely fast, bulky and expensive high volume document scanner enjoy a healthy growth.

Furthermore, there are several types of scanners, each scanner type being specifically designed for a particular purpose: monochrome, color, sheet-fed, flatbed, handheld, photo-print, photo-slide, SCSI host interface, printer port host interface, IEEE1284 parallel port host interface, serial port host interface, USB host interface, IEEE1394 FireWire host interface, etc. Development costs and time to market are therefore significant. Only scanner manufacturers that are fully committed to document scanner products can afford to be involved in document scanner developments. Manufacturer that wish to incorporate document scanner functions into other types of equipment (multifunction peripherals for example) in order to differentiate their products from those of the competition have experienced difficulties in meeting their goal.

SUMMARY OF THE INVENTION

The Scanner Power Module according to the present invention is a circuit that provides all the power signals required to operate sheet-fed, flatbed, duplex and slides document scanners. The circuit accepts universal worldwide primary AC input or commonly found DC input and generates all the supply outputs required by the scanner digital control electronics, analog electronics, image sensor electronics, light sources, stepper motors, auxiliary motors, solenoids and relays.

The Scanner Power Module according to the present invention is designed to cooperate with low power control electronics that control the overall operation of the document scanner. The Scanner Power Module can drive and modulate all types of light sources, such as LED (Light Emitting Diode) arrays, CCFL (Cold Cathode Fluorescent Lights), filament bulbs or electro-luminescent screens. The Scanner Power Module can drive all types of stepper motors in the micro stepping mode.

The Scanner Power Module is designed to be totally integrated in a single module using miniaturized components and advanced energy efficient power components in order to achieve an extremely small size. The circuit significantly reduces EMC (Electro-Magnetic Compatibility) problems and provides PFC (Power Factor Correction). The circuit incorporates all the required electrical safety protections. The circuit can be mass-produced at a very attractive price.

The Scanner Power Module substantially reduces design complexity, overall packaging size, design costs and time to market. Integrators will be able to integrate document scanning devices in other types of devices such as printers, keyboards, computer cases, display monitors, and the like with no disruption to their existing power supply designs, no additional heat extraction, and with a minimum of required space. Manufacturers can expect a significantly reduced time to market, a very high performing product, and an extremely competitive price.

Users will be able to enjoy a much smaller size document scanner without having to deal with a cumbersome external power supply.

According to an exemplary embodiment of the present invention, the power circuit for document scanners comprises power conversion and regulation circuits to provide power sources for document scanner analog circuits; power conversion and regulation circuits to provide power sources for document scanner digital circuits; power conversion and regulation circuits to provide power sources for control circuits of at least one image sensor; power conversion and regulation circuits to provide power sources for at least one document feed motor and power conversion and regulation circuits to derive power sources for at least one light source. A safe and isolated power source is included, the power conversion and regulation circuits drawing power from the safe and isolated power source.

Advantageously, the power circuit according to the present invention provides all power sources and power signals required in documents scanners and hence offers an optimized power circuit solution to design document scanners.

According to one embodiment, the safe and isolated power source is directly connected to a domestic main alternating current power line, to derive safe and isolated power directly therefrom, thereby deriving various forms of power sources required in documents scanners from the domestic power line. The safe and isolated power source may further comprise power conversion and regulation means to perform power factor correction, to reduce power distortion on the main alternating current power line. The power conversion and regulation circuits for the document feed motor or motors may furthermore comprise motor drive circuits to provide safe and protected power control signals to control the rotation of the document feed motor, the motor drive circuits being controlled by low power control circuits.

According to another exemplary embodiment, light source power conversion and regulation circuits comprise light source controller circuits to provide safe and protected power signals to modulate the illumination intensity of the light source or light sources, the light source controller circuits being controlled by low power control circuits. The light source controller circuits may furthermore comprise an LED array light source controller to modulate the illumination intensity of at least one LED array light source. Moreover, the light source controller circuits may comprise a CCFL controller circuit to modulate the illumination intensity of at least one CCFL light source.

The power circuit according to the present invention may also comprise solenoid drive circuits to provide safe and protected power signals to activate at least one solenoid, the solenoid drive circuits being controlled by low power control circuits. Relay drive circuits may also be included to provide safe and protected power signals to activate at least one relay, the relay drive circuits being controlled by low power control circuits.

Power management means may also be included to minimize a power consumption of the document scanner. Likewise, power-monitoring circuits may be included to generate proper power-on reset signals and to generate fault signals. Overload, overheating and electrical damage protection circuits are also included in other exemplary embodiments of the present invention. In like manner, safety circuits or devices for protecting against human injury and equipment damage may also be included.

Auxiliary motor drive circuits may be included in the power circuit according to the present invention, to provide safe and protected power signals to control the rotation of auxiliary motors, the auxiliary motor drive circuits being controlled by low power control circuits.

Another embodiment of the present invention comprises means for reducing electromagnetic emissions and for reducing electromagnetic susceptibility, to comply with EMC requirements.

According to yet another embodiment, the power conversion and regulation circuits for the document feed motor or motors comprise a micro-stepping control and driver circuit. This circuit provides power signals to activate the rotation of the stepper motor or motors in a micro-step mode, to insure that the rotation of the stepper motor or motors is smooth. The micro-stepping control and driver circuit may further comprise control means for activating predetermined acceleration and deceleration profiles for the rotation of stepper motors, thereby providing smooth document feed.

Heat conductive materials to dissipate heat generated by the power circuit may be included in other embodiments. The passive components, active components and materials are optimized to generate minimal heat and are optimized to dissipate heat generated by the power circuit.

According to another exemplary embodiment, the integrated power supply comprises a primary AC to DC converter whose input is connected to a domestic main alternating current power line. The output of the primary converter provides safe and isolated DC voltage. A first DC to DC converter supplies motors, solenoids and relays with DC input voltage; a second DC to DC converter supplies scanner analog electronics with regulated DC voltages and a third DC to DC converter supplies scanner digital electronics with selected DC voltage levels. A LED light source controller controls at least one array of light emitting diodes of the scanner and a CCFL DC to AC controller controls at least one cold cathode fluorescent light of the scanner. The first to third DC to DC converters, the LED light source controller and the CCFL DC to AC controller have their respective inputs connected to an output of the primary AC to DC converter. In this manner, the integrated power supply provides all of the power requirements of the document scanner.

The primary converter may comprise means for performing power factor correction.

Another embodiment includes a micro-stepping control and driver means to supply power signals to drive at least one stepper motor in either the standard mode or the microstepping mode. The micro-stepping and control and driver means comprises power circuits to control, with precision, the amount of current in the windings of the stepper motor. The profile of the current in the stepper motor windings may be defined in look-up tables that are downloadable from a memory of the host computer.

A primary AC to DC converter bypass means may be included, for bypassing the primary AC to DC converter when an appropriate DC source is available. In this manner, the first to third DC to DC converters, the LED light source controller and the CCFL DC to AC controller have their respective inputs directly connected to this DC source, when it is available.

BRIEF DESCRIPTION OF THE DRAWINGS

For a further understanding of the objects and advantages of the present invention, reference should be had to the following detailed description, taken in conjunction with the accompanying figures, wherein.

DETAILED DESCRIPTION OF THE INVENTION

The document scanners that can best take advantage of the scanner power module are monochrome and color sheet-fed, flatbed, slides and duplex scanners.

Figure 1:
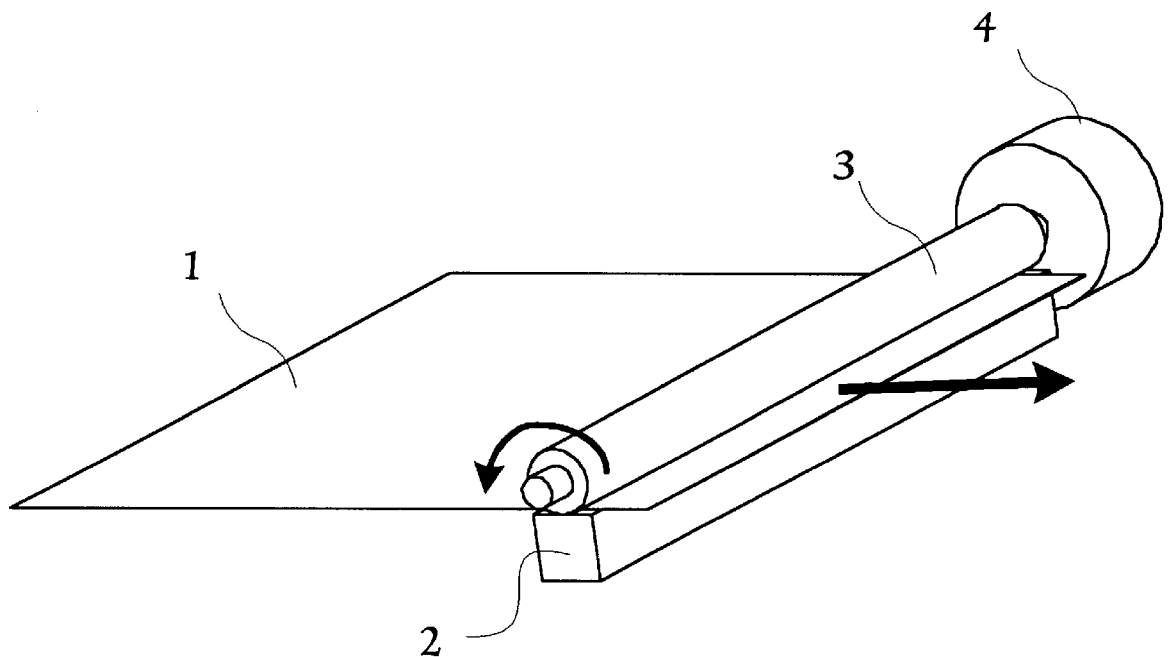
FIG. 1 is a perspective view of the major mechanical elements of a sheet-fed scanner. The electronics circuits that control the scanner and the communication link with the host computer are not represented.

FIG. 1 shows a typical arrangement for a sheet-fed document scanner. In FIG. 1, a document 1 is displaced by a rotating roller paper feeding mechanism 3 driven by a motor 4 over a fixed linear sensor to that senses reflected light from the document. Alternatively, the paper feeding mechanism can be a belt, a plurality of rollers or a plurality of rollers and belts. Illumination is provided from the linear sensor side. The linear sensor with its associated electronics records a line of information at a time. When the document is driven by the motor and roller, the linear sensor, together with its associated electronics, records the entire document area swept. The scanner control electronics and the communication link with the host computer are not shown on FIG. 1.

Figure 2:
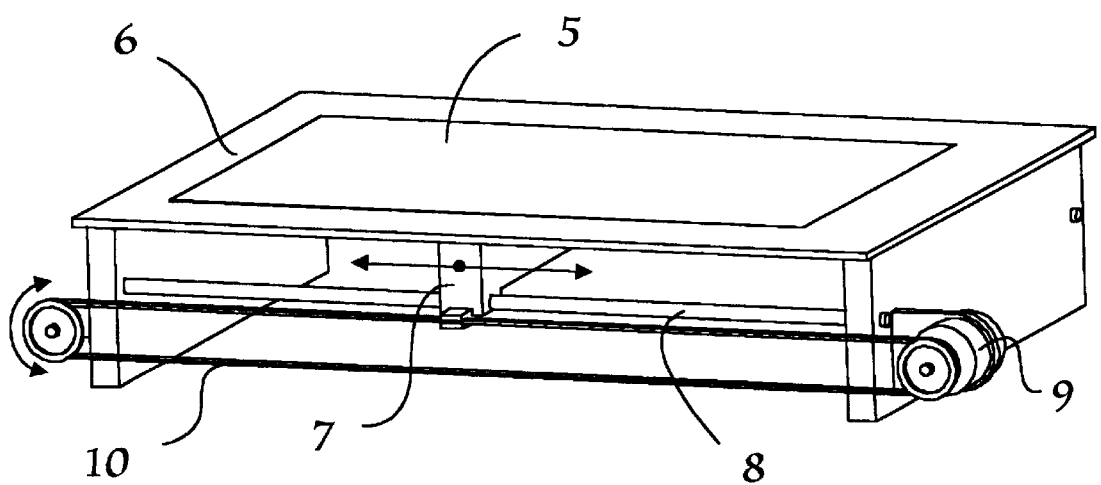
FIG. 2 is a perspective view of the major mechanical elements of a flatbed scanner. The electronics circuits that control the scanner and the communication link with the host computer are not represented.

FIG. 2 shows a typical arrangement for a flatbed document scanner. In FIG. 2, a document 5 is placed on a transparent support 6 such as thin glass, and a linear sensor 7 is displaced under the glass using sliding guides 8, a motor 9 and a belt 10. For reflective documents, illumination is provided from the sensor side, that is, the light traverses the glass support and reflects on the surface of the document. For transparent documents, illumination is provided from behind the document, such that light traverses the document and the glass support. The linear sensor, together with its associated electronics, records a line of information when not in motion. When driven by the motor, belt and guides, the linear sensor with its associated electronics records the entire document area swept. Some flatbed scanners can be fitted with a document feeder that introduces and places the document over the transparent support, then ejects the document when the scanning operation is completed. The linear sensor does not record any information while the document is being fed in. The scanner control electronics and the communication link with the host computer are not shown on FIG. 2.

Figure 3:
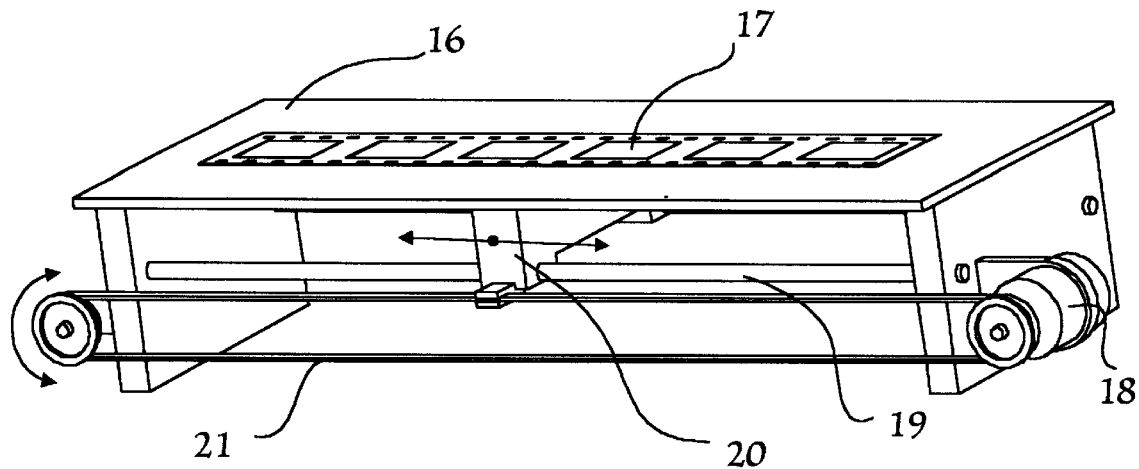
FIG. 3 is a perspective view of the major mechanical elements of a slides scanner. The electronics circuits that control the scanner and the communication link with the host computer are not represented.

FIG. 3 shows a typical arrangement for a slides document scanner. In FIG. 3, a document 17 which is a positive film, a negative film or a photographic slide is placed on a transparent support 16 such as thin glass, and a linear sensor 20 is displaced under the glass using sliding guides 19, a motor 18 and a belt 21. Illumination is provided from behind the document, causing the light to traverse the document and the glass support. The linear sensor, together with its associated electronics, records a line of information when not in motion. When driven by the motor, belt and guides, the linear sensor with its associated electronics records the entire document area swept. The scanner control electronics and the communication link with the host computer are not shown on FIG. 3.

In an alternative design, the mobile carriage that displaces the image sensor can be replaced by an apparatus having a fixed line image sensor and an oscillating mirror. The oscillating mirror, driven by a stepper motor, deflects the light received from the document in order to create the sweep across the document.

Figure 4:
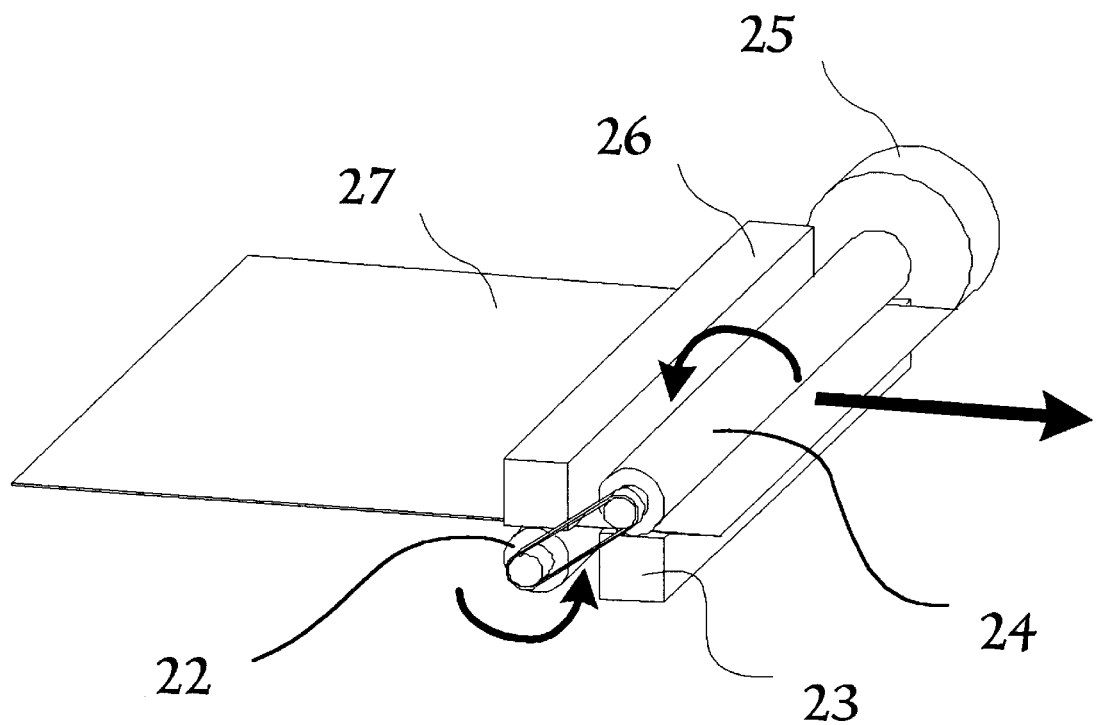
FIG. 4 is a perspective view of the major mechanical elements of a duplex scanner. The electronics circuits that control the scanner and the communication link with the host computer are not represented.

FIG. 4 shows a typical arrangement for a duplex document scanner. In FIG. 4, a document 27 is displaced by two rotating rollers 22 and 24 driven by a motor 25 over two fixed linear sensors 26 and 23 that sense reflected light from each side of the document. Alternatively, the paper feeding mechanism may be a plurality of belts, or a plurality of rollers and belts. Illumination is provided from each linear sensor. The linear sensors, together with their associated electronics, record a line of information for each side of the document. When the document is driven by the motor and rollers, the linear sensors, together with their associated electronics, record the entire document area swept on both sides. The scanner control electronics and the communication link with the host computer are not shown on FIG. 4.

The image sensors used in sheet-fed scanners, flatbed scanners, slides scanners and duplex scanners are either CCD (Charged Coupled Device) monochrome or color sensors having a width of approximately 40 to 60 mm fitted with a suitable optical apparatus to reduce the image of the document and an illumination source,—or monochrome or color CIS (Contact Image,Sensor). These three contact sensors are usually available in B6, A4, A3 sizes, or approximately 100 mm to 300 mm. The image sensors produce an analog signal that is commonly called a video signal.

Illumination for sheet-fed scanners, flatbed scanners, slides scanners and duplex scanners is produced using LED (Light Emitting Diodes), CCFL (Cold Cathode Fluorescent Light) tubes, electroluminescent screens or filament lamps. Color dropout, that is the elimination of a color, is produced by using color filters that block the required wavelength or by selecting light sources that generate the required wavelength.

Figure 5:
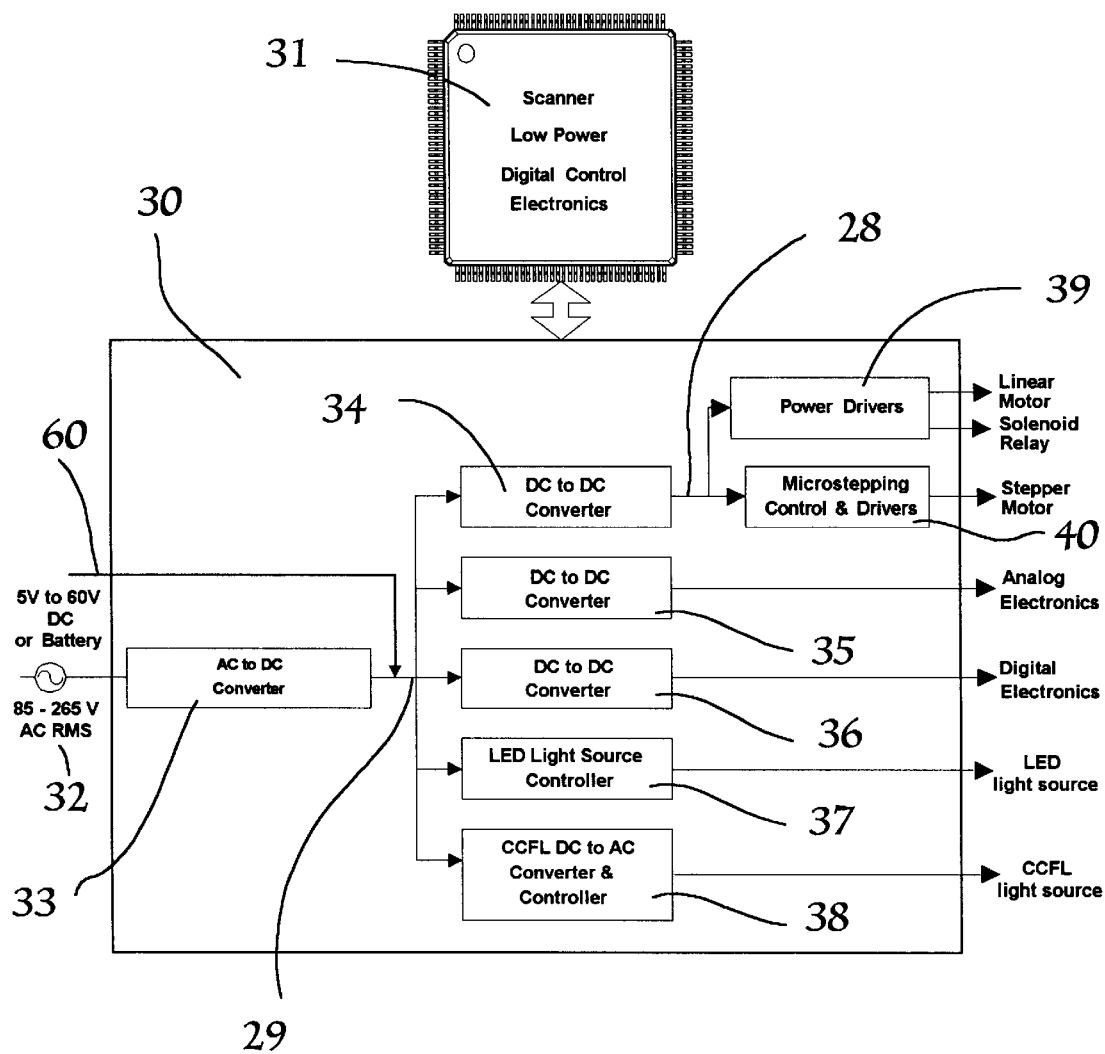
FIG. 5 is a diagram representing the architecture of the Scanner Power Module according to the present invention.

FIG. 5 shows the architecture of the Scanner Power Module according to the present invention. The Scanner Power Module 30 comprises eight major functional modules; namely 33, 34, 35, 36, 37,38, 39 and 40.

The AC to DC converter 33 integrates the necessary circuits to convert primary domestic main AC alternating current power source, ranging from 85 V AC to 265 V AC, into a secondary safe isolated DC voltage 29 that can be selected between 5 V DC and 60 V DC. The AC to DC converter 33 can advantageously make use of advanced switching power supply transformer technology. PFC (Power Factor Correction) is performed in the AC to DC converter whenever required.

If suitable safe DC power source 60 is available, as this may be the case when the scanner is to be integrated into a PC computer case where ample +5 V DC or +12 V DC supply is available from the main PC power supply, or for a battery operated scanner, the AC to DC converter 33 can be bypassed or eliminated.

The DC to DC converter 35 integrates the necessary circuits to convert the secondary voltage 29 into a plurality of precisely regulated DC voltages such as +15 and −15 V to supply the scanner low power analog circuits.

The DC to DC converter 36 integrates the necessary circuits to convert the secondary voltage 29 into a plurality of precisely regulated DC voltages such as +3.3 V and +5 V to supply the scanner low power digital circuits.

The LED Light Source Control 37 integrates the necessary circuits to deliver the required voltage and current to modulate one or a plurality of light sources switch-on, switch-off, and illumination intensity under the control of the low power digital control electronics 31. The LED Light Source Control 37 integrates some form of Digital to Analog Converter to convert the digital levels supplied by the scanner controller 31 into continuously variable power signals. The LED Light Source Control 37 draws its power from the secondary DC voltage 29.

The CCFL DC to AC Converter 38 integrates the necessary circuits to deliver the required high AC voltage and current to modulate one or a plurality of CCFL (Cold Cathode Fluorescent Lamps) switch-on, switch-off, and illumination intensity under the control of the low power digital control electronics 31. The high AC voltage generated by the CCFL DC to AC Converter 38 ranges typically between 200 V AC and 600 V AC. The CCFL DC to AC Converter 38 integrates some form of Digital to Analog Converter to convert the digital levels supplied by the scanner controller 31 into continuously variable AC signals. The CCFL DC to AC Converter 38 draws its power from the secondary DC voltage 29.

The DC to DC Converter 34 integrates the necessary circuits to deliver the high DC voltage 28 required to supply electromechanical devices such as stepper motors, linear motors and solenoids. The high DC voltage 28 ranges typically between 24 V and 60 V. The DC to DC Converter 34 draws its power from the secondary DC voltage 29.

The Micro-stepping Control and Drivers Unit 40 integrates the necessary circuits to deliver the required power signals to drive one or a plurality of stepper motors in the standard mode or in the micro-stepping mode. The Micro-stepping Control and Drivers Unit 40 is capable of controlling, in cooperation with the scanner controller 31, stepper motors in the micro-step mode to enable fine position control, high starting torque, anti-vibration operation, very fast step-rate and optimum energy efficiency. Micro stepping is achieved by precisely controlling, using power circuits, the amount of current in the stepper motor windings at any given time. The profile of the current is defined in look-up tables that can be downloaded from the host computer. The windings current profile can be optimized for various operating conditions such as acceleration/ deceleration rate, maximum load, maximum speed, minimal vibration, or motor temperature.

The Micro-stepping Control and Drivers Unit 40 integrates some form of Digital to Analog Converters to convert the digital levels supplied by the scanner controller 31 into continuously variable current to drive the stepper motor windings.

The Micro-stepping Control and Drivers Unit 40 is capable of controlling, in cooperation with the scanner controller 31, all types of stepper motors used in sheet-fed, flatbed, slides and duplex scanners.

The Micro-stepping Control and Drivers Unit 40 is capable of generating, in cooperation with the scanner controller 31, smooth trapezoidal-curve or S-curve accelerations and decelerations for stepper motors.

The Micro-stepping Control and Drivers Unit 40 is capable of controlling, in cooperation with the scanner controller 31, all types of ordinary or hybrid stepper motors such as unipolar, bi-polar, tri-phase or 5-phase stepper motors.

The Micro-stepping Control and Drivers Unit 40 can accommodate stepper motors with any step angle such as 24 steps, 48 steps, 100 steps, 200 steps or 400 steps per revolution.

The Micro-stepping Control and Drivers Unit 40 is capable of generating, in cooperation with the scanner controller 31, micro-stepping current profile control signals for stepper motors using various common techniques such as direct DAC (Digital to Analog Conversion) with associated power amplifiers or PWM (Pulse Width Modulation) with associated power switching devices.

The Micro-stepping Control and Drivers Unit 40 is supplied by the secondary DC voltage 29 and contains all the necessary electrical protections against electrical damage and overload when actuating the stepper motors.

The Power Drivers Unit 39 integrates the necessary circuits to deliver the required power signals to drive one or a plurality of linear motors and one or a plurality of solenoids or relays. The Power Drivers Unit 39 integrates some form of Digital to Analog Converters to convert the digital levels supplied by the scanner controller 31 into continuously variable current to drive the linear motors.

The Power Drivers Unit 39 is supplied by the secondary DC voltage 29 and contains all the necessary electrical protections against electrical damage and overload when actuating the linear motors, the solenoids or the relays.

The Scanner Power Module contains the necessary circuits to minimize power consumption, to generate power reset signals when primary power is applied and to generate a power fault signals when the primary power fails.

The Scanner Power Module contains the necessary circuits to provide complete electrical safety against human injury and equipment damage.

The Scanner Power Module contains the necessary circuits to provide electrical protections against electrical damage when driving power devices, as well as overload and overheating protection.

The Scanner Power Module contains the necessary circuits to provide complete EMC (Electro-Magnetic Compatibility) and PFC (Power Factor Correction) whenever required.

Figure 6:
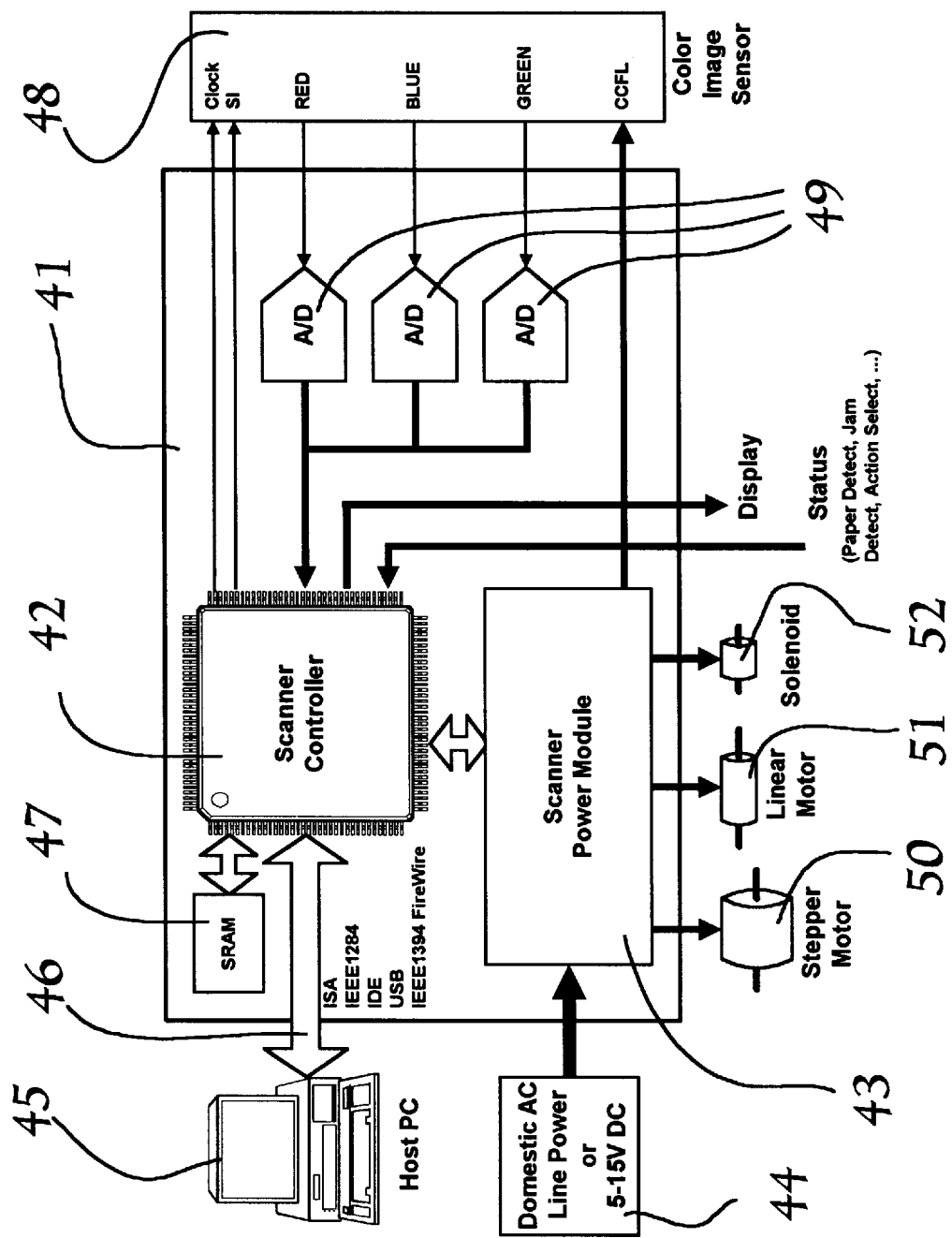
FIG. 6 is a diagram representing a typical electrical and electronics design for a scanner that makes use of the Scanner Power Module according to the present invention.

FIG. 6 illustrates the simplicity of designing a straightforward sheet-fed scanner fitted with a motorized bulk feeder using the Scanner Power Module according to the present invention. The scanner main electronics board 41 essentially requires, in addition to the Scanner Power Module 43, four types of electronics circuits: low power digital control electronics 42, memory 47, analog electronics such as signal amplifiers and ADCs 49 and a set of interface circuits 46 for communication with the host computer 45. The Scanner Power Module 43 converts primary power 44 to safe secondary power supplied to all the scanner circuits, sensors and actuators. The Scanner Power Module 43 provides power signals to the roller feed stepper motor 50, the bulk feeder linear motor 51, the bulk feeder solenoids 52 and the light source 48 under the control of the low power digital electronics 42.

Figure 7:
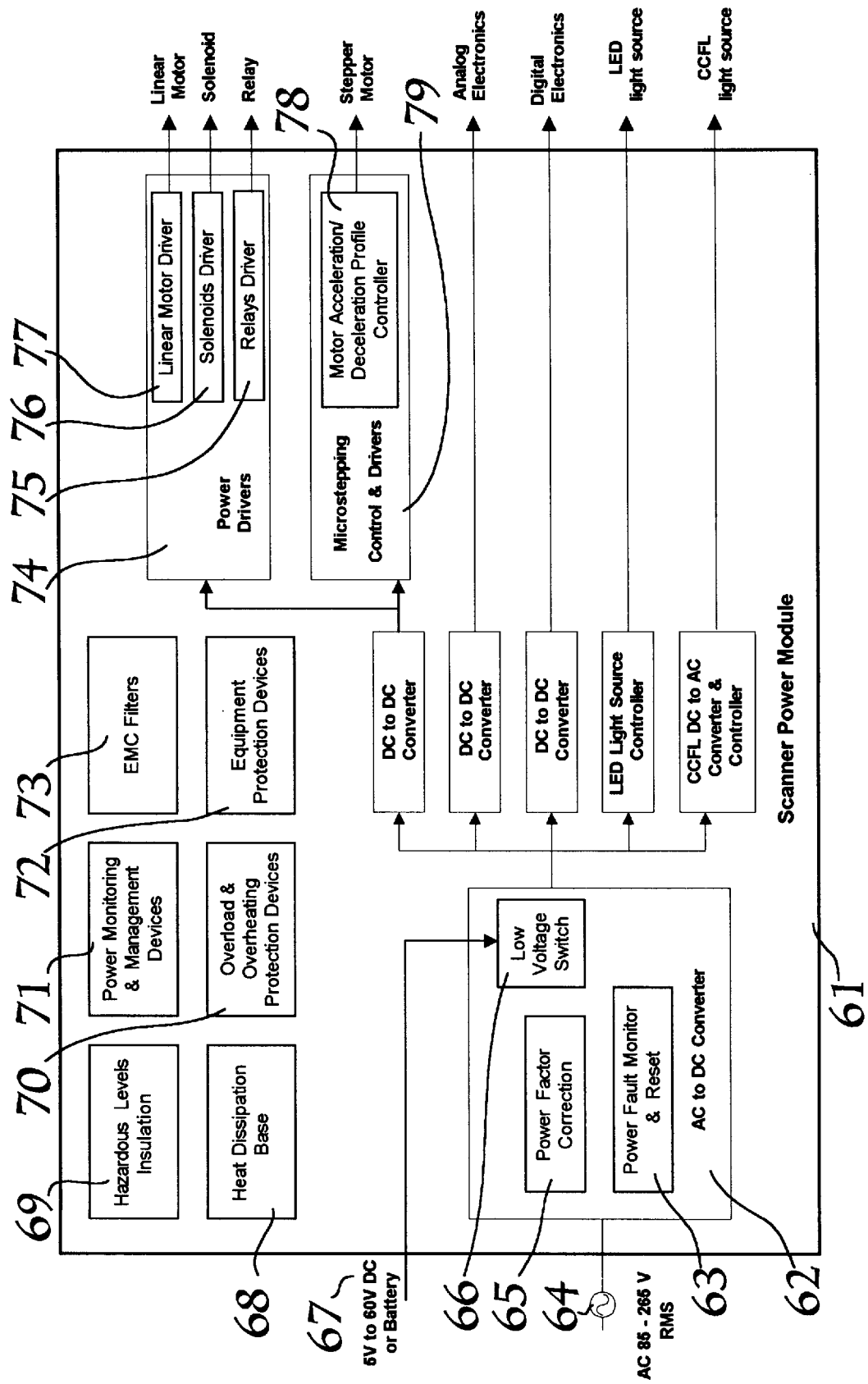
FIG. 7 is a diagram representing details of the architecture of the Scanner Power Module according to the present invention.

FIG. 7 shows further details of the architecture of the Scanner Power Module according to the present invention. The Scanner Power Module 61 comprises 6 functional units; namely 68, 69, 70, 71, 72, and 73, that are distributed throughout the Scanner Power Module.

The electronics components of the Scanner Power Module are assembled directly on an efficient heat dissipation base 68 such as a printed circuit on an aluminum base, using mounting techniques as much as possible.

Electrical Connection and electronics components generating hazardous electrical levels are adequately insulated by hazardous levels insulation Unit 69 to provide protection against human contact.

Elements that generate excessive heat or that can be destroyed by overloading are protected by overload and overheating protection devices 70 that are placed at the proper locations.

Unused functions or components are automatically switched into a low power mode by power monitoring and management devices 71 that are placed at the proper locations.

Electromagnetic compatibility filters 73 are placed at the proper locations in order to reduce electromagnetic interference and susceptibility to admissible levels.

Equipment protection devices 72 such as fuses and electrostatic discharge shunts (ESD) are located at the appropriate locations.

The AC to DC converter 62 further comprises a power factor correction 65 stage ink order to reduce distortion on the main alternating current power line 64, a power fault monitor and reset unit 63 to detect an imminent power outage and dispatch reset signals to appropriate electronics circuit in order to shut down the electronic functional units in an orderly fashion.

A low voltage switch circuit 66 enables automatic switching between the main alternating current power line 64 and the low voltage DC or battery input 67.

The power drivers module 74 comprises linear motor driver circuits 77, solenoid driver circuits 76 and relay driver circuits 75.

The microstepping control and drivers module 79 further comprises a motor acceleration/deceleration profile controller 78 in order to generate smooth stepper motor start up and stop.

Most low cost scanners found on the market are very slow. Obtaining faster performance requires, besides faster image sensors and processing circuits, significant redesign of the power supply to increase power delivery, to vent the generated heat and to find space to fit the larger components.

A range of miniaturized and very power efficient Scanner Power Modules to suit popular types of scanners can be mass-produced at a very attractive price.

While the foregoing detailed description has described several embodiments of this invention, it is to be understood that the above description is illustrative only and not limiting of the disclosed invention. For example, the Scanner Power Module according to the present invention may include drive and control circuits for driving and controlling devices and circuits other than those specifically enumerated in the description above without, however, departing from the spirit and scope of the present invention. Indeed, a number of other modifications will no doubt occur to persons of skill in this art. All such modifications, however, should be deemed to fall within the scope of the present invention. Thus, the invention is to be limited only by the claims as set forth below.

What is claimed is:

1. A power conversion circuit for document scanners, comprising:
    at least one analog circuit power conversion and regulation circuit to provide at least one power source for document scanner analog circuits;
    at least one digital circuit power conversion and regulation circuit to provide at least one power source for document scanner digital circuits;
    at least one image sensor power conversion and regulation circuit to provide at least one power source for control circuits of at least one image sensor;
    at least one document feed motor power conversion and regulation circuit to provide at least one power source for at least one document feed motor;
    at least one light source power conversion and regulation circuit to provide at least one power source for at least one light source, comprising a light source controller circuit to provide safe and protected power signals to modulate an illumination intensity of the at least one light source, the at least one light source controller circuit being controlled by a low power control circuit; and
    a safe and isolated power source, the power conversion and regulation circuits drawing power from the safe and isolated power source,
    whereby, the power circuit provides all power sources and power signals required in documents scanners and hence offers an optimized power circuit solution to design document scanners.

2. A power circuit according to claim 1, wherein the safe and isolated power source is directly connected to a domestic main alternating current power line, to derive safe and isolated power directly therefrom, thereby deriving various forms of power sources required in documents scanners from the domestic power line.

3. A power circuit according to claim 1, wherein the safe and isolated power source further comprises power conversion and regulation means to perform power factor correction, to thereby reduce a power distortion on the main alternating current power line.

4. A power circuit according to claim 1, wherein the at least one document feed motor power conversion and regulation circuit comprises a motor drive circuit to provide safe and protected power control signals to control a rotation of at least one document feed motor, the motor drive circuit being controlled by a low power control circuit.

5. A power circuit according to claim 1, further comprising at least one solenoid drive circuit to provide safe and protected power signals to activate at least one solenoid, the at least one solenoid drive circuit being controlled by a low power control circuit.

6. A power circuit according to claim 1, further comprising at least one relay drive circuit to provide safe and protected power signals to activate at least one relay, the at least one relay drive circuit being controlled by a low power control circuit.

7. A power circuit according to claim 1, wherein the at least one light source controller circuit comprises an LED array light source controller to modulate an illumination intensity of at least one LED array light source.

8. The power circuit of to claim 1, wherein the at least one light source controller circuit comprises a CCFL controller circuit to modulate an illumination intensity of at least one CCFL light source.

9. A power circuit according to claim 1, further comprising power management means to minimize a power consumption of the document scanner.

10. A power circuit according to claim 1, further comprising at least one circuit to perform power monitoring, generate proper power-on reset signals, and generate fault signals.

11. A power circuit according to claim 1, further comprising at least one auxiliary motor drive circuit to provide safe and protected power signals to control a rotation of auxiliary motors, the at least one auxiliary motor drive circuit being controlled by a low power control circuit.

12. A power circuit according to claim 1, further comprising means for reducing electromagnetic emissions and reduce electromagnetic susceptibility, to thereby comply with EMC requirements.

13. A power circuit according to claim 1, further comprising protection means against overload and overheating.

14. A power circuit according to claim 1, further comprising protection means for protecting the power circuit against electrical damage.

15. A power circuit according to claim 1, further comprising safety means for protecting against human injury and equipment damage.

16. A power circuit according to claim 1 wherein the at least one document feed motor power conversion and regulation circuit comprises a micro-stepping control and driver circuit for providing power signals to activate a rotation of at least one stepper motor in a micro-step mode, thereby providing smooth rotation of the at least one stepper motor.

17. A power circuit according to claim 16, wherein the at least one micro-stepping control and driver circuit further comprises control means for activating predetermined acceleration and deceleration profiles for the rotation of stepper motors, thereby providing smooth document feed.

18. A power circuit according to claim 1, further comprising heat conductive materials to dissipate heat generated by the power circuit.

19. A power circuit according to claim 1, further comprising passive components, active components and materials optimized to generate minimal heat and optimized to dissipate heat generated by the power circuit.

20. An integrated power supply for document scanners, comprising:
    a primary AC to DC converter having an input connected to a domestic main alternating current power line, an output of the primary converter providing safe and isolated DC voltage;
    a first DC to DC converter for supplying at least one of motors, solenoids and relays with DC input voltage;
    a second DC to DC converter for supplying scanner analog electronics with regulated DC voltages;

a third DC to DC converter for supplying scanner digital electronics with selected DC voltage levels;

an LED light source controller for controlling at least one array of light emitting diodes; and a CCFL DC to AC controller for controlling at least one cold cathode fluorescent light of the scanner, wherein the first to third DC to DC converters, the LED light source controller and the CCFL DC to AC controller have their respective inputs connected to an output of the primary AC to DC converter, whereby the integrated power supply provides all power requirements of document scanners.

21. An integrated power supply according to claim 20, wherein the safe and isolated DC voltage is selected within a range of about 5 V DC to about 60 V DC.

22. An integrated power supply according to claim 20, wherein the first DC to DC converter outputs a DC voltage selected within a range of about 24 V DC to about 60 V DC.

23. An integrated power supply according to claim 20, wherein second DC to DC converter outputs a plurality of regulated DC voltages within a range of +15 V and −15 V to supply low power analog circuits of the scanner.

24. An integrated power supply according to claim 20, wherein the third DC to DC converter outputs a plurality of regulated DC voltages within a range of +3.3 V and +5 V to supply low power digital circuits of the scanner.

25. An integrated power supply according to claim 20, wherein the primary converter comprises means for performing power factor correction.

26. An integrated power supply according to claim 20, further comprising a power driver means for driving linear motors, solenoids and relays, the power driver means having an input connected to an output of the first DC to DC converter.

27. An integrated power supply according to claim 20, further comprising a micro-stepping control and driver means, for supplying power signals to drive at least one stepper motors in one of a standard mode and a micro-stepping mode, the input of the micro-stepping control and driver means being connected to an output of the first DC to DC converter.

28. An integrated power supply according to claim 27, wherein the micro-stepping and control and driver means comprises power circuits to precisely control an amount of current in windings of the stepper motor.

29. An integrated power supply according to claim 28, wherein a profile of the current in the stepper motor windings is defined in look-up tables that are downloadable from a host computer.

30. An integrated power supply according to claim 20, wherein the LED light source controller comprises at least one Digital to Analog Converter to convert digital levels supplied by a scanner controller into continuously variable power signals.

31. An integrated power supply according to claim 20, wherein an output of the CCFL DC to AC converter ranges from about 200 V AC to about 600 V AC.

32. An integrated power supply according to claim 20, wherein the CCFL DC to AC converter comprises at least one Digital to Analog Converter to convert digital levels supplied by a scanner controller into continuously variable AC signals.

33. An integrated power supply according to claim 20, further comprising primary AC to DC converter bypass means for bypassing the primary AC to DC converter when an appropriate DC source is available, whereby, the first to third DC to DC converters, the LED light source controller and the CCFL DC to AC controller have their respective inputs directly connected to the appropriate DC source when the DC source is available.

34. An integrated power supply for document scanners, comprising:

a primary AC to DC converter having an input connected to a domestic main alternating current power line, an output of the primary converter providing safe and isolated DC voltage;

a plurality of DC to DC converters for supplying at least one of motors, solenoids, relays, analog electronics and digital electronics with DC input voltage;

a light source controller for controlling at least one light source of the scanner; and a DC to AC controller for controlling at least one of a cold cathode fluorescent light, an electro-luninescent screen and a filament light of the scanner, wherein each of the plurality of DC to DC converters, the light source controller and the DC to AC controller have their respective inputs connected to an output of the primary AC to DC converter, whereby the integrated power supply provides all power requirements of document scanners.

\* \* \* \* \*